Aug. 11, 1959  D. L. SCHWARTZ  2,898,955
INSULATION BLOCK HOLDING DEVICE FOR POWER SAWS
Filed Sept. 3, 1957  3 Sheets-Sheet 1
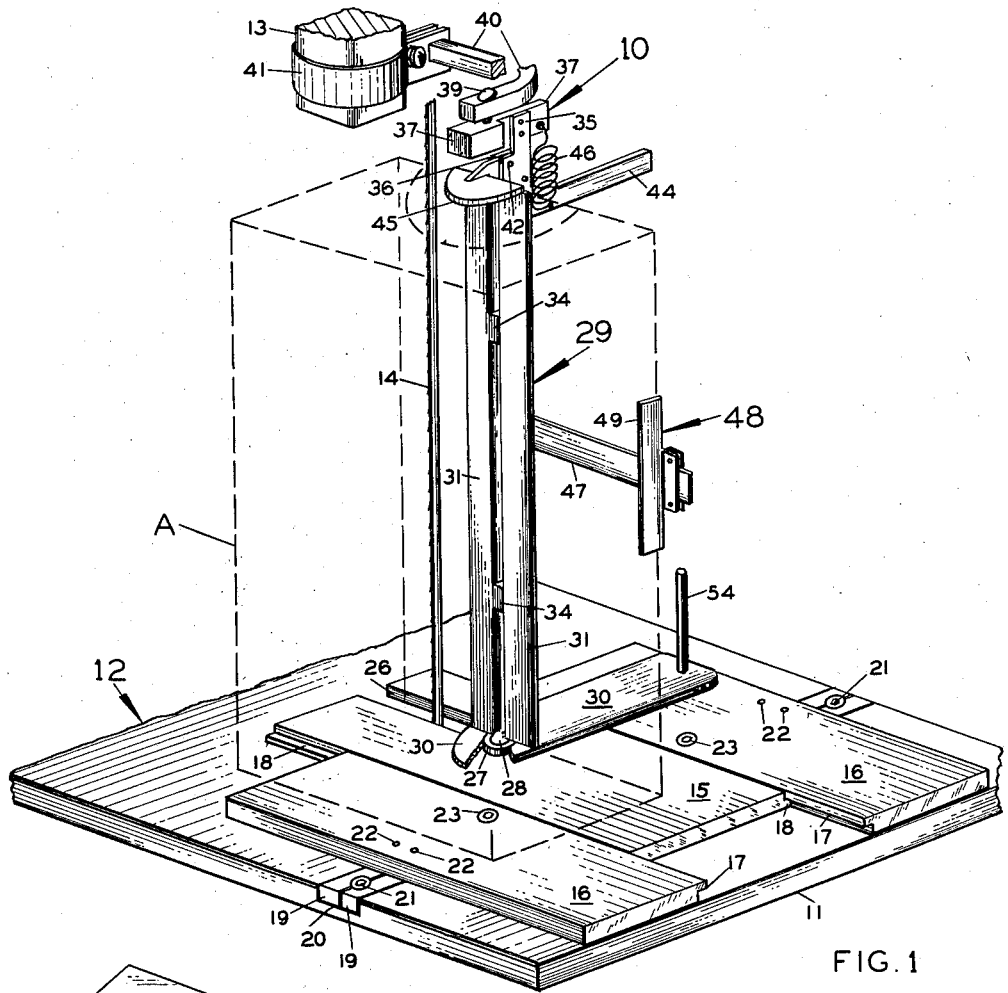
FIG. 1
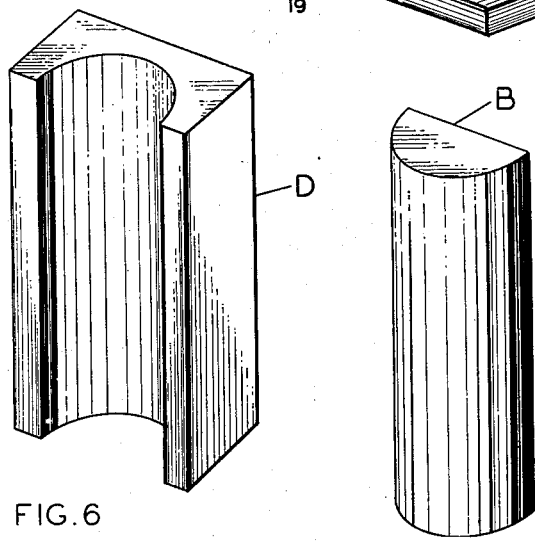
FIG. 6
FIG. 7
INVENTOR.
DAVID L. SCHWARTZ
BY
*Salvatore G. Militana*
ATTORNEY

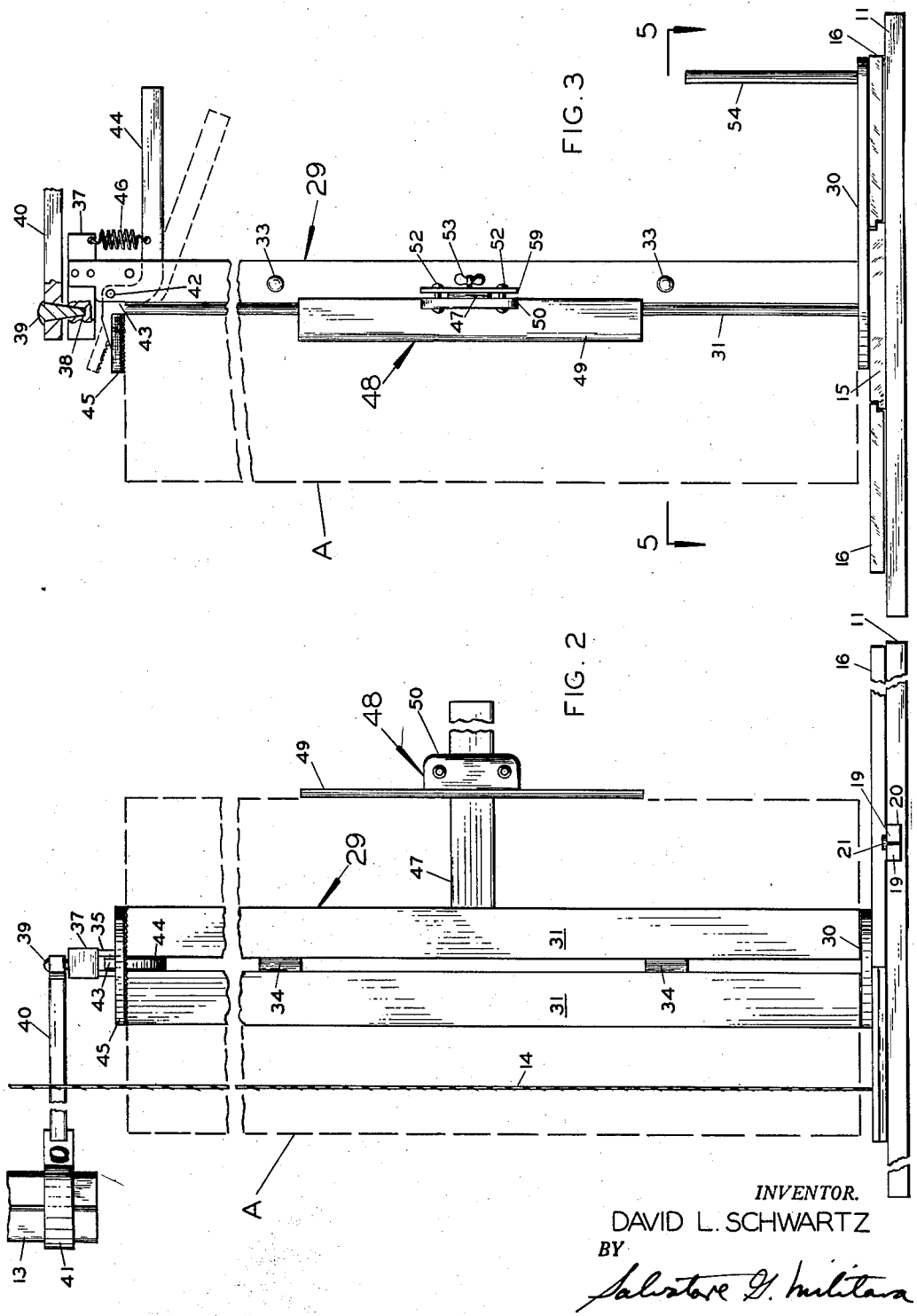

Aug. 11, 1959   D. L. SCHWARTZ   2,898,955
INSULATION BLOCK HOLDING DEVICE FOR POWER SAWS
Filed Sept. 3, 1957   3 Sheets-Sheet 3

INVENTOR.
DAVID L. SCHWARTZ
BY
ATTORNEY

United States Patent Office 2,898,955
Patented Aug. 11, 1959

2,898,955

INSULATION BLOCK HOLDING DEVICE FOR POWER SAWS

David L. Schwartz, North Miami, Fla.

Application September 3, 1957, Serial No. 681,760

1 Claim. (Cl. 143—171)

This invention relates to power sawing devices and is more particularly directed to an insulation block holding machine for use on power saws.

In my copending application Serial No. 459,106, filed September 20, 1954, entitled "Insulation Forming Machine," issued January 10, 1958, as Patent No. 2,846,824, I show and describe a machine which forms a semi-cylindrical insulation pipe covering. The machine utilizes a cylindrical spindle whose outer surface is covered with an abrasive material for forming the core and the outer semi-cylindrical surface of the pipe insulation by a grinding action.

The present invention contemplates the forming of insulation for the covering of pipes by cutting rather than grinding the core and the semi-cylindrical outside surface of the insulation block. This is accomplished by mounting the device of the instant application on a power band or jigsaw.

Therefore, a principal object of the present invention is to provide a simple and inexpensive device mountable on a power jig or band saw for cutting block insulation in the production of pipe covering.

Another object of the present invention is to provide a pipe insulation cutting machine which is readily mounted on a conventional power band or jigsaw and which is easily operated for the production of pipe covering.

A still further object of the present invention is to provide a pipe insulation cutting device described as above which permits portions of the block cut from the original block to be salvaged and be further cut to form smaller sized pipe converings or cemented together with other similar portions to form larger sized pipe covering of any desired size.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claim.

In the drawings:

Figure 1 is a perspective view of my insulation cutting device shown mounted on a table of a power band saw shown only in part with an insulation block shown in dotted lines.

Figure 2 is a front elevational view thereof.

Figure 3 is a side elevational view thereof.

Figure 6 (Sheet 1) is a perspective view of an insulation block with its core cut by the cutting device.

Figure 7 is a perspective view of the core cut from the block shown in Figure 6.

Figure 4:
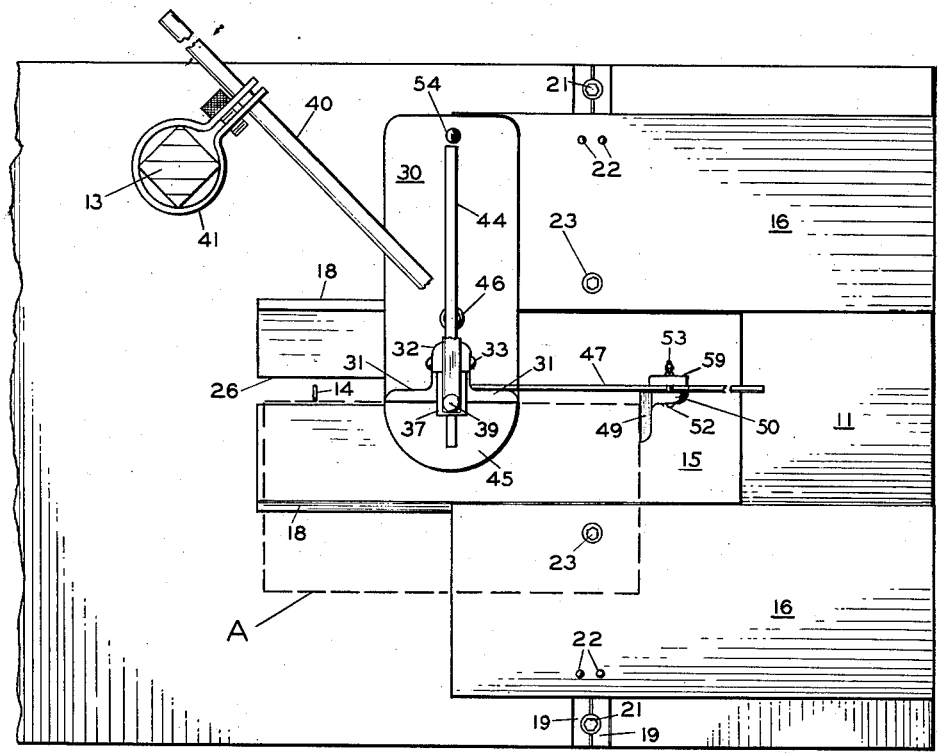
Figure 4 is a top plan view thereof.
Figure 5:
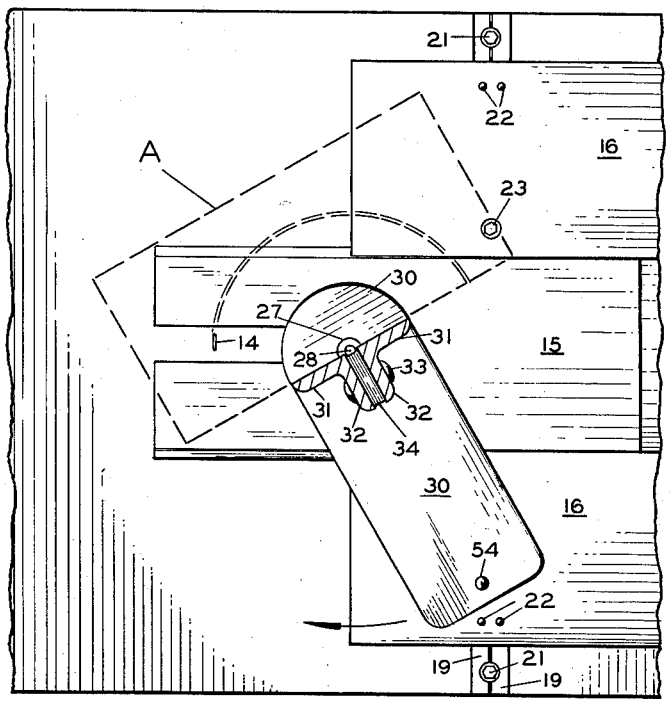
Figure 5 is a cross sectional view taken along the line 5—5 of Figure 3 with the device swung through an arc slightly less than 180° and the cut made by a saw shown by double dotted lines.

Referring to the drawings wherein like numerals are used to designate smiliar parts throughout the several views, the numeral 10 refers generally to my insulation cutting device on a table 11 of a power saw 12 which is of conventional construction and is shown here only in part for the purpose of illustration.

The power saw 12 which may be preferably a power band saw or a jigsaw is shown consisting of the table 11, a head 13 and a cutting member 14, although a saw blade is shown as the cutting member 14, any other type of cutting members, such as hot wire, etc., may be used in lieu thereof. The remaining structure is not shown here since it forms no part of the present invention.

My insulation block cutting machine 10 is provided with a support comprising a movable plate member 15 slidably mounted between spaced apart fixed plate members 16 which are undercut or rabbeted as at 17 along their inner edges. The slidable plate member 15 is likewise rabbeted at both of its edges as at 18, which slotted portions interengage the rabbeting 17, 17 to permit the sliding movement of the plate member 15 relative to the stationary plate members 16. The slot of the rabbeting 17 is smaller than the height of the rabbeting 18 so that the plates 16 must be loosened to permit the slidable plate member 15 to slide.

Means are provided for securing the stationary plate members 16 to the table 11 comprising a pair of wedge type bars 19 positioned in a slot 20 in the table 11 with expansion bolts 21 securing the bars 19 in the slot 20. The expansion bolts 21 are threaded into a semicircular bore formed in each of the bars 19. As the expansion bolts 21 are threaded inwardly the bars 19 are forced away from each other and thereby become securely wedged in the slot 20. The plate members 16 are secured to the bars 19 by pins 22 which extend through the plate members 16 into the bars 19. Further securing bolts 23 serve to lock the slidable plate member 15 in position. This is accomplished upon the tightening of the bolts 23 whereby the rabbeted edges 17 engage the rabbeted edges 18 and frictionally engage them tightly against the table surface 11 against any possible movement. The slidable plate member 15 is provided with a longitudinal slot 26 which extends to approximately the mid-portion of the plate member 15, the saw blade 14 of the power saw 12 extending through the slot 26.

In alignment with the slot 26 is a bushing 27 mounted in the slidable plate member 15, the bushing 27 receiving a pivot pin 28 projecting from the lower portion of a block support member 29 to permit the pivotal movement thereof. The block support member 29 consists of a base plate 30 to the under surface of which the pivot pin 28 is mounted and a standard extending vertically and secured adjacent one end of the base plate 30. The standard is constructed of a pair of angle bars mounted with one of the leg portions 31 in alignment and forming a backing for an insulation block A and the other leg portions 32 secured together in spaced relation with each other by means of bolts or rivets 33. Spacers 34 are positioned between the leg portions 32. The leg portions 32 extend above the height of the leg portions 31 as at 35 and are spaced and notched as at 36 to receive a pivot pin support block 37 which extends between the top portion 35 of leg portions 32 where the block is secured. The block 37 is provided with a bore 38 (Fig. 3) which is in vertical alignment with the bushing 27 in the slidable plate member 15, which bore receives a pivot pin 39 mounted at the end of an arm 40 whose other end is adjustably secured to a clamp 41 mounted on the power saw head 13.

Pivotally mounted as by pivot pin 42 is a block holding lever 43 extending between the leg portions 32 rearwardly to form a handle 44. At the forward end of the lever 43 is secured a horizontally disposed plate 45 which is disposed vertically above that portion of the plate 30 that is forward of the angle bars 31 and which cooperates with the latter to engage and releasably hold the insulation block A while being cut as is explained in greater detail hereinafter. A coil spring 46 extending between the pivot support member 37 and the handle 44 of the lever 43 maintains the block engaging plate 45 in yielding engagement with the top of the insulation block A.

Means are provided for enabling an operator of the device 10 to place with alacrity an insulation block A with its medial portion lying in a vertical plane passing through the pivot pins 28 and 39, the center of rotation of the device 10. This structure consists of a horizontal bar 47 having one end secured to the rear surface of a leg 31. Along the other end of the horizontal bar 47 there is slidably mounted a stop member 48 constructed of an angle bar, one leg 49 of which acts as a stop for the insulation block A and the other leg 50 is releasably secured to the bar 47. A plate member 59 in conjunction with the leg 50 and pins 52 forms a clamp between which the horizontal bar 47 extends. The plate member 59 is provided with a wing bolt which is received by a threaded bore formed in the plate member 59. It can be seen that upon the threading of the wing bolt 53, the bolt will engage the horizontal bar 47 and the plate member 59 will slide outwardly on the pins 52 until the heads thereof prevent further movement of the plate member 59 and the stop member 48 will become locked to the horizontal bar 47. A handle 54 is mounted in an upright position on the base plate 30 for rotating the block support member 29.

In mounting the device 10 on a power saw 12, the bars 19, 19 are placed in the slot 20 of the table and the expansion bolts 21 threaded tightly thereby anchoring the device 10.

With the bolts 23 in their loosened position, the slidable plate member 15 is positioned as determined by the diameter of the cut desired. The distance between the saw blade 14 and the pivot pin 28 is equal to the radius of the cut or one-half the diameter. The bolts 23 are tightened and the pivot arm 40 adjusted on the clamp 41 so that the pivot pin 39 is positioned in vertical alignment with the pivot pin 28. The position of the stop member 48 is adjusted on the horizontal bar 47. The distance from the vertical center of the support member 29 to the inner surface of the leg 49 of the stop member 48 should be equal to one-half the full length of the insulation block. Now, the handle 44 of the block retaining lever 43 is forced downwardly against the coil spring pressure 46, the block retaining plate 45 is tilted upwardly and the insulation block A is placed on the base plate 30 in contact relation with the legs 31 and the corner edge of the block A in abutting relation with the stop member 48. The lever arm 44 is then released and the spring 46 compels the lever to pivot on its pin 42, the plate member 45 engaging the top of the insulation block A.

The operator then grasps the handle 54 and causes the support member 29 to commence to swing on its pivots 27 and 39. The power saw blade 14 engages the block and begins to cut into the wall thereof. As the blade 14 continues to cut into the insulation block A the support member is made to rotate until the handle 54 has swung through 180 degrees of arc at which time the blade 14 will have severed a semi-circular core B (see Figure 7) from the insulation block which now appears as block D with its core B removed (see Figure 6).

The insulation block D may be used as a pipe covering or the outer surface thereof can be made semi-cylindrical. The core B which has been removed from the block A can have its core removed by the device 10 and the remainder of the block B used as a pipe covering of smaller dimensions.

What I claim as new is:

An insulation block supporting device for mounting on a power saw having a saw blade, a table and a head, the combination comprising support locking means mounted on said table, a slidable support plate secured to said support locking means, said slidable support plate having a slot for receiving said blade, pivot means mounted on said slidable support plate in alignment with said slot, a lower block support member pivotally mounted on said slidable support plate, an upper block engaging member, an upright member secured to said lower block support member and extending above said upper block engaging member, pivot means securing said upper block engaging member to said upright member, clamp means engaging said head of said power saw, an arm member adjustably secured to said clamp at one end, a second pivot pin mounted on the other end of said arm member, said second pivot pin being in vertical alignment with said first pivot means, pivot support means receiving said second pivot pin mounted on said upright member above said upper block engaging member, handle means mounted on said upper block engaging means, spring means secured to said handle means yieldingly urging said upper block engaging means into engagement with said insulation block, an elongated member secured at one end to said upright member and extending normal thereto, a stop member slidably mounted on said elongated member for engaging a corner edge of said insulation block and a handle for pivoting said device on said table.

References Cited in the file of this patent

UNITED STATES PATENTS

| | | |
|---|---|---|
| 406,225 | Metz | July 2, 1889 |
| 666,275 | Keasey | Jan. 22, 1901 |
| 2,010,882 | Ocenasek | Aug. 13, 1935 |
| 2,682,285 | Blum | June 29, 1954 |
| 2,696,854 | Woodruff | Dec. 14, 1954 |
| 2,766,784 | Antczak | Oct. 16, 1956 |

FOREIGN PATENTS

| | | |
|---|---|---|
| 9,314 of 1900 | Great Britain | May 21, 1900 |
| 24,501 | Netherlands | July 15, 1931 |
| 715,350 | France | Sept. 28, 1931 |